United States Patent

Lai et al.

[11] Patent Number: 5,953,109
[45] Date of Patent: Sep. 14, 1999

[54] METHOD AND APPARATUS FOR IMPROVING THE ACCURACY OF LASER RANGE FINDING

[75] Inventors: Yi-Ren Lai, Taichung; Pie-You Chien, Panchiao, both of Taiwan

[73] Assignee: Asia Optical Co., Inc., Taichung, Taiwan

[21] Appl. No.: 08/986,535

[22] Filed: Dec. 8, 1997

[51] Int. Cl.$^6$ .................................................. G01C 3/08
[52] U.S. Cl. ...................................... 356/5.01; 356/4.01
[58] Field of Search ........................... 356/5.01–5.08, 356/4.01

[56] References Cited

U.S. PATENT DOCUMENTS

| | | | |
|---|---|---|---|
| 4,770,526 | 9/1988 | Manhart et al. | 356/5 |
| 4,827,317 | 5/1989 | Mizushima et al. | 356/73.1 |
| 4,888,477 | 12/1989 | Nankivil | 250/201 |
| 5,046,839 | 9/1991 | Krangle | 356/5 |
| 5,157,403 | 10/1992 | Urkowitz | 342/111 |
| 5,221,956 | 6/1993 | Patterson et al. | 356/28 |
| 5,359,404 | 10/1994 | Dunne | 356/5 |
| 5,612,779 | 3/1997 | Dunne | 356/5.01 |
| 5,633,706 | 5/1997 | Cho et al. | 356/5.01 |
| 5,652,651 | 7/1997 | Dunne | 356/5.01 |
| 5,719,664 | 2/1998 | Besesty et al. | 356/5.01 |

*Primary Examiner*—Stephen C. Buczinski

[57] ABSTRACT

A method and apparatus for improving the accuracy of laser ranging finding. The time difference obtained from laser range finding is converted into a voltage signal by a linear charge circuit with constant current and then digitized into a digital value by an analog to digital converter. A self calibration method is used to compensate for the thermal effect in a user's environment and improve the precision of the distance measurement obtained from the laser range finder. The self calibration method includes measuring two voltage values by using two correction pulses with known width after the laser range finder is initialized. The standard values in response to the two correction pulses are used to calibrate the measured data for obtaining a correction gain and a correction level. An instant distance value measured from a target can be calibrated by the correction gain and level to achieve higher precision of range finding.

7 Claims, 6 Drawing Sheets

METHOD AND APPARATUS FOR IMPROVING THE ACCURACY OF LASER RANGE FINDING

FIELD OF THE INVENTION

The present invention relates to laser range finding, and more specifically to a method and apparatus for laser range finding in which self calibration technique is used to reduce the thermal effect of its environmental condition and improve the accuracy of distance measurement.

BACKGROUND OF THE INVENTION

Range finders based on laser techniques have been successfully developed as disclosed in U.S. Pat. Nos. 5,359,404, 5,612,779, and 5,574,552 granted to Laser Tech Co. A range finder employs a laser diode as its light source can range 1 Km distance with high precision within the range of 1 m. There are three major drawbacks in the techniques employed in the prior arts. First, a method of fast charging and slow discharging is used to achieve the function of expanding the receiving time. Therefore, the time period when the receiving circuit receives the respective echo light after the laser diode transmits the light is expanded and transformed into the distance by counting the time samples at a low speed clock. The desired circuit in the finder costs highly due to the requirement of fast charging and slow discharging. Second, automatical threshold adjustment is used to optimize the sensitivity of the receiving circuit. However, the feedback sensitivity is too high to control. Third, the environmental condition is not considered for the prior art laser light such that the shift phenomenon due to thermal effect may influence the accuracy and stability.

SUMMARY OF THE INVENTION

The object of the present invention is to provide a method in which self calibration technique is used to improve the accuracy of distance measurement in a laser range finder. According to the present invention, the accuracy is within 1 m. What this invention emphasizes is the function of self-calibration and thermal compensation.

According to the present invention, a product has been successfully developed and has the following features:

1. There is an advantage of low power consumption for the present invention because the time period of transmitting and receiving the laser is converted into a voltage and then the voltage is transformed into a respective distance such that only a 9 V battery as a power supply is needed for more than ten thousand of operation cycles.

2. The accuracy of measurement can be within 0.5 m.

3. The output power of a semiconductor laser used in the present invention is from 24 W to 33 W and the pulse width is from 20 ns to 50 ns in order to measure a concrete building target 1 Km away.

To further increase the accuracy of the laser range finder of the present invention, a user may set the number of measurements in the laser range finder when ranging a target. By transmitting a laser light multiple times and receiving multiple returned data, all data can be averaged to acquire more precise distance measurement.

In accordance with the above-mentioned, the circuit technique with self-calibration and thermal compensation in the present invention used to improve increase the accuracy of range finding includes primarily a linear charge circuit with constant current and a self calibration circuit. The linear charge circuit transforms the time difference in laser measurement into a voltage signal. A digital data is obtained from the voltage signal by an analog to digital converter and a respective distance data calculated by a central processing unit (CPU) is shown in a display unit. The calibration circuit simulates two target distance signals for the linear charge circuit with constant current so as to transform into two corresponding data for comparing with standard data by the central processing unit, and acquire a correction level and a correction gain provided for the central processing unit to instantly correct the data and maintain the desired accuracy and thermal compensation effect of measurement.

Other features and advantages of the present invention will become apparent from the following description which refers to the accompanying drawings.

DETAILED DESCRIPTION OF THE PREFERRED EMBODIMENTS

Figure 1:
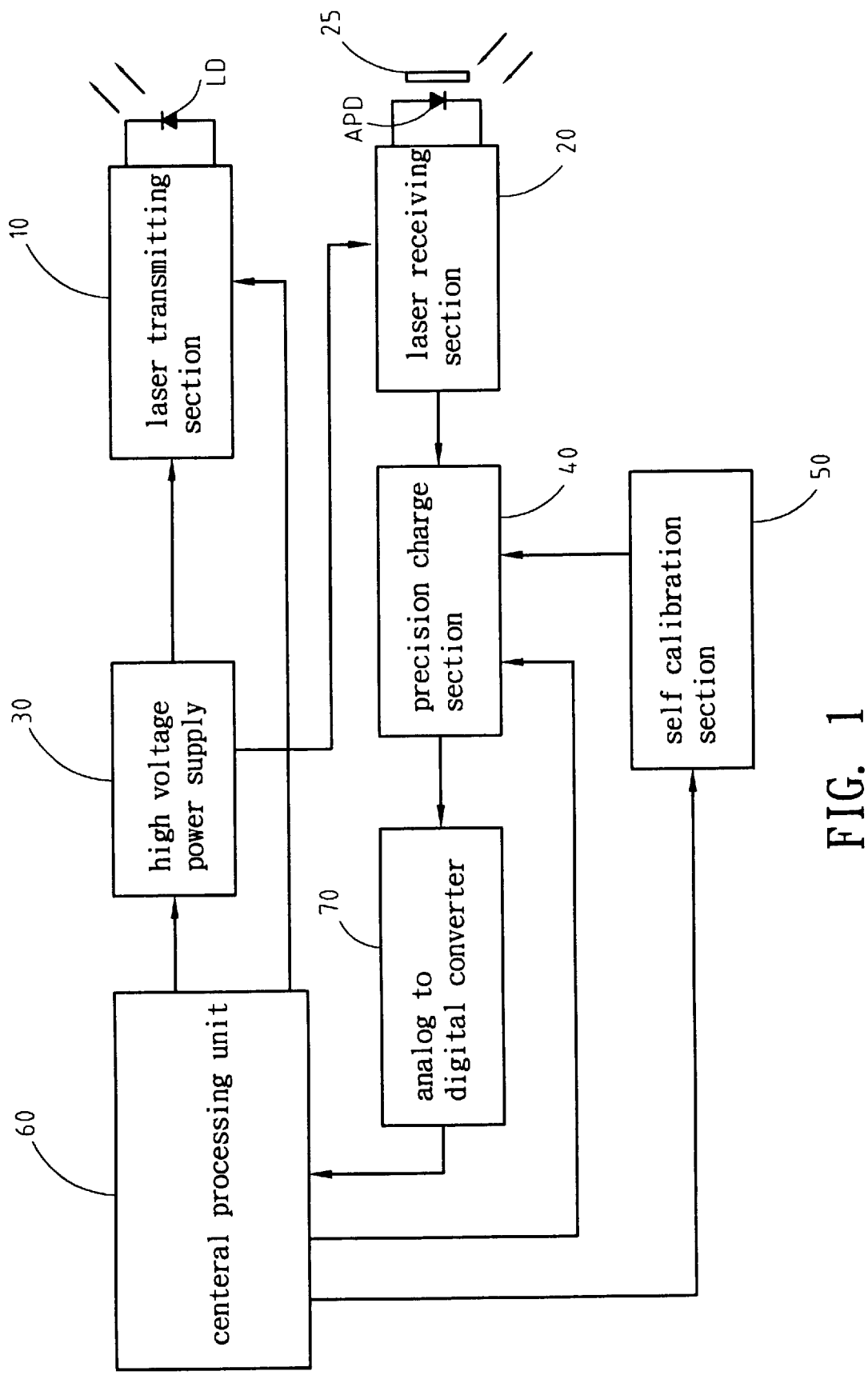
FIG. 1 shows a functional block diagram of a laser range find in the present invention.

With reference to FIG. 1, the laser range finder of the present invention comprises a laser transmitting section 10, a laser receiving section 20, a high voltage (HV) power supply 30, a precision charge section 40, a self-calibration section 50, a CPU 60 and an analog to digital converter 70.

The laser transmitting section 10 receives a desired high voltage provided by the HV power supply 30 and a trigger signal from the CPU 60 to make a laser diode LD transmit laser light at an appropriate moment.

The laser receiving section 20 receives a desired detector bias voltage to receive and amplify the echo laser reflected by the target, and adjust the highest working sensitivity.

Figure 4:
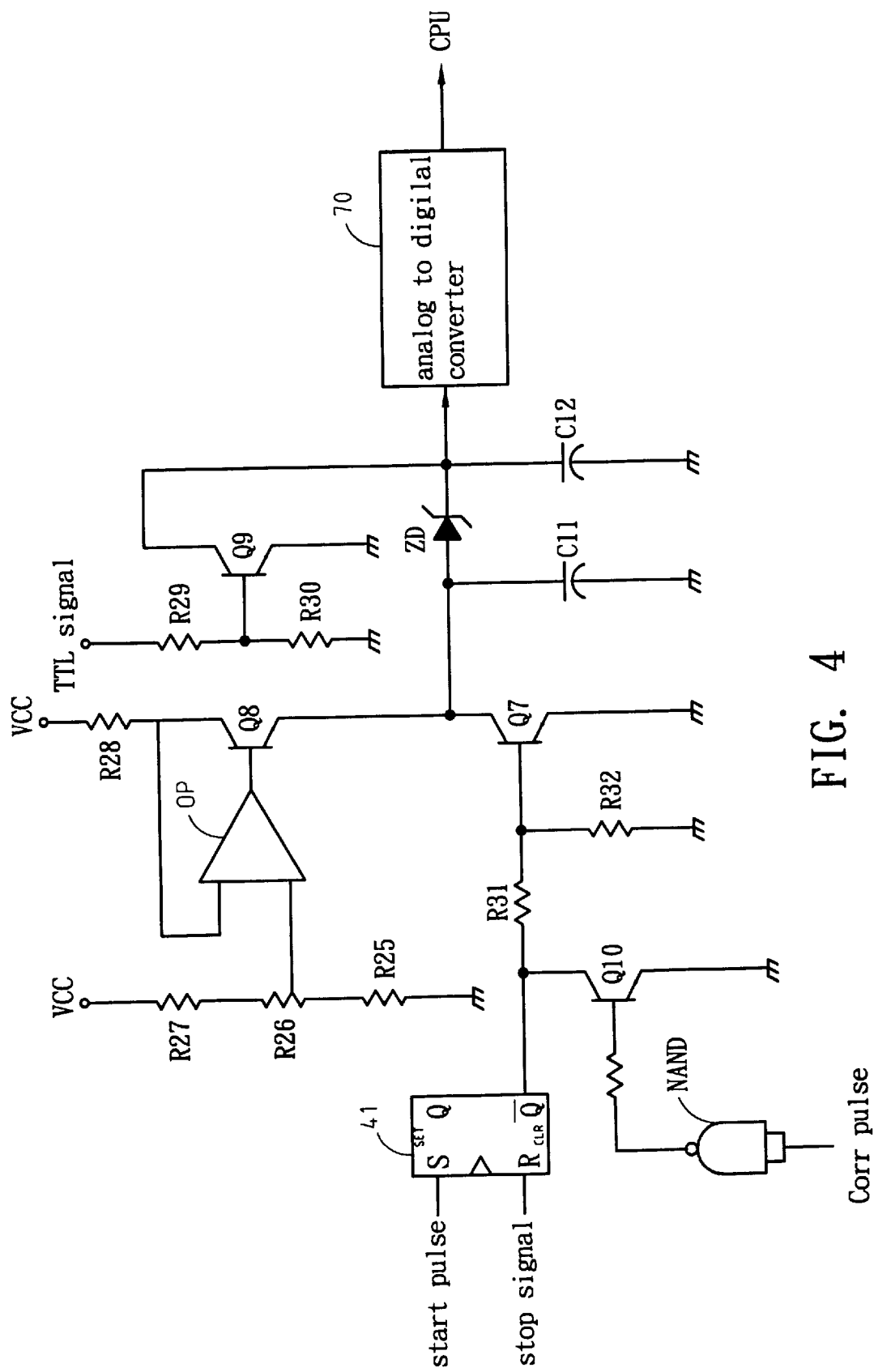
FIG. 4 shows a schematic diagram of a precision charge and self-calibration sections in the present invention.

The precision charge section 40 transforms the time difference between the transmitted pulse and the received pulse by an internal R/S flip-flop (as shown in FIG. 4) into a respective pulse width and then converts the pulse width into a respective voltage ratio through a charge circuit with a linear capacitor.

The self-calibration section 50 is a two-point self-calibration circuit which employs the principle that two points form a line to correct and compensate for the variation of a current source and capacitance due to thermal effect.

The CPU 60 provides desired timing signals for the above devices.

The analog to digital converter 70 (a ten-bit A/D converter is used in this invention) converts the voltage signal from the precision charge section 40 into a digital signal and then transfers the digital signal to the CPU 60 for further treatment.

The spirit of the present invention is to provide a method for improving the accuracy of laser range finding, so only the laser transmitting section 10, the laser receiving section 20, the precision charge section 40, the self-calibration section 50, the CPU 60 and the analog to digital converter 70 are further described in the following description to illustrate how to increase the precision and stability for laser range finding.

Figure 2:
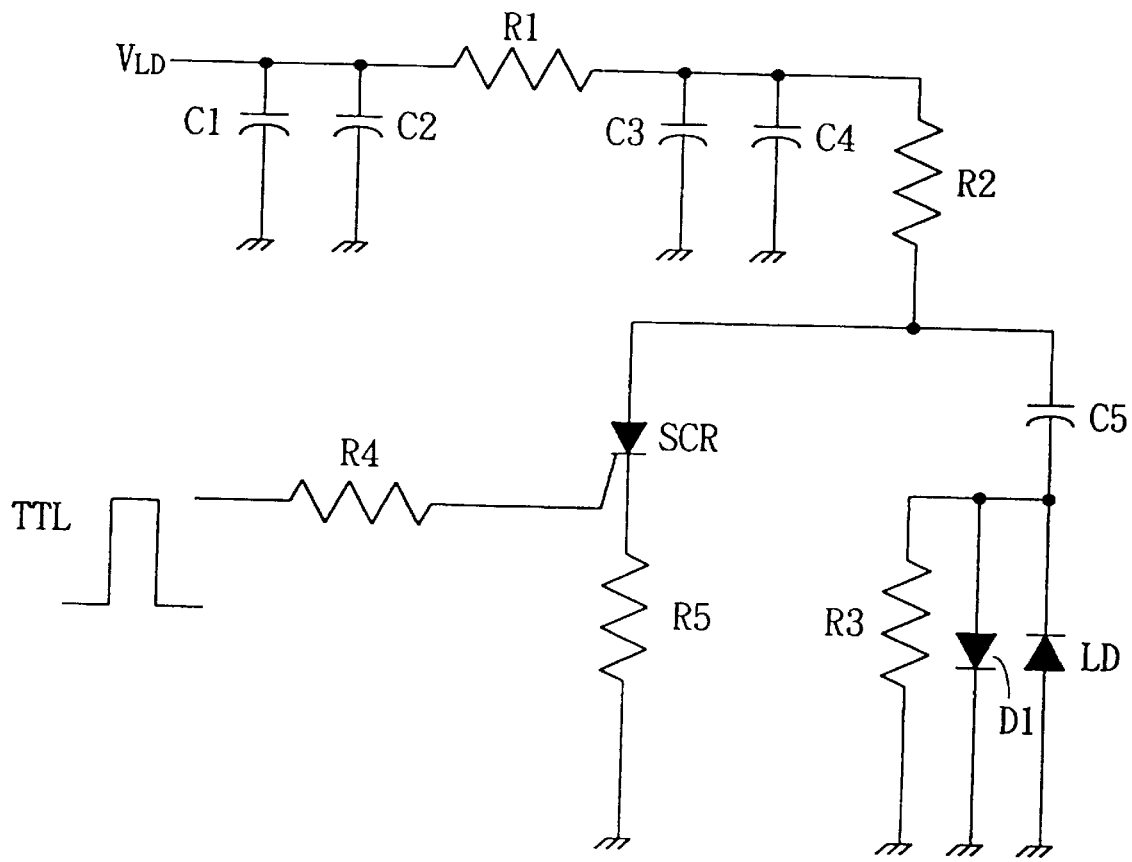
FIG. 2 illustrates a schematic circuit diagram of a transmitting portion of the finder in the present invention.

A schematic circuit diagram of the transmitting portion of the finder in the present invention is shown in FIG. 2. The number of the components of the circuit is few and can be packaged in a small anti-EM wave box. As illustrated in FIG. 2, capacitors C1, C2, C3, and C4, and a resistor R1 form a π filter to eliminate the interferece of the HV power supply 30. Resistor R2 and capacitor C5 form a charge circuit. The capacitor C5, laser diode LD, fast diode D1, resistor R3 and SCR construct a discharge circuit. The charge and discharge circuits are used to generate a laser light. The trigger time is determined by a TTL positive edge signal which is imposed on the resistors R4 and R5 to trigger the SCR. The timing is controlled by the CPU 60.

Figure 3:
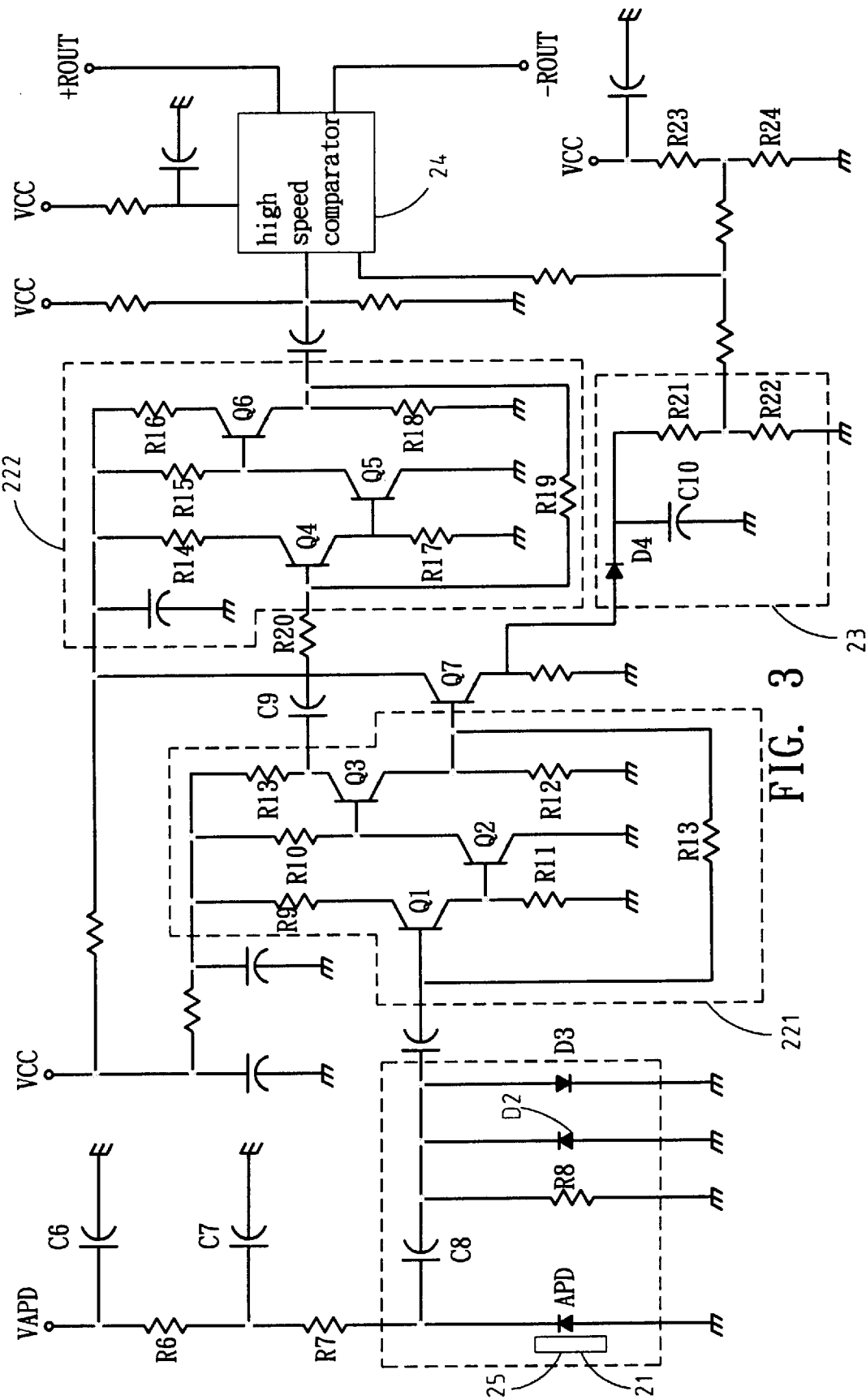
FIG. 3 illustrates a schematic circuit diagram of a receiving portion of the finder in the present invention.

With reference to FIG. 3, a schematic circuit diagram of the receiving portion 20 of the finder in the present invention comprises a log amplifier 21, a first stage amplifier 221, a second stage amplifier 222, a sun-noise averaging circuit 23, a high speed comparator 24 and an optical band-pass filter 25.

The bias of the detector APD is generated by the π filter which consists of capacitors C6 and C7 and a resistor R6 to eliminate the Interferece from the HV power supply 30 and the high voltage coupling noise from the laser transmitting section 10 and the laser receiving section 20.

The above optical band-pass filter 25 is placed in front of the detector APD to filter out most of the sun-noise.

The load resistor R7 connects the resistor R6 and to the detector and the log amplifier 21 cosisting of the capacitor C8, the resistor R8 and the fast diodes D2 and D3 which are used to provide a dynamic range for the laser receiving section 20. Accordingly, similar to AGC, the gain decreases as the target is near and the gain increases as the target is far away.

Three transistors Q1, Q2 and Q3 (which are low noise transistors used in the present invention) and five resistors R9, R10, R11, R12 and R13 form a first stage amplifier 221 which transforms the laser signal received by the APD into a voltage signal. The first stage amplifier 221 and the log amplifier 21 form a band-pass filter. Suitable parameters are selected for the band-pass filter to match the frequency response of the laser pulse.

A second stage amplifier 222 consists of transistors Q4, Q5 and Q6 and resistors R14, R15, R16, R17, R18 and R19. The amplifier 222 is coupled to the drain of the transistor Q3 through a resistor R20 and a capacitor C9. Thus, another voltage amplifier with a band-pass filter is obtained. Accordingly, a matching filter composed of the log amplifier 21, the first stage amplifier 221 and the second stage amplifier 222 may generate a signal corresponding to the laser pulse to obtain an optimal S/N.

The output of the first stage amplifier 221 passes a transistor Q7 as an emitter follower through a rectifying diode D4, a capacitor C10 and the divider resistors R12 and R22 (i.e., the sun-noise averaging circuit 23) to obtain an average noise for the first stage amplifier 221. The average noise corresponding to the white noise in the optical band-pass filter 25 is induced by the sunlight. For the coupling noise generated by the HV power supply section 30, the HV power supply section 30 is automatically shut down by a voltage feedback circuit because the high voltage is constructed in advance.

The threshold voltage of a high speed comparator 24 is adjusted by the output voltage of the average sun-noise and the fixed threshold voltage formed by the resistors R23 and R24. The threshold voltage will increase when the sun-noise increases and the threshold voltage will decrease when the sun-noise decreases.

The most important point for the laser range finder is how to obtain a desired distance data by converting the time difference between when the laser light is incident onto the target and when the receiving section 20 receives the reflected laser light from the target. The technique used in the present invention is to employ a concept of precision charge for effectively converting the time difference into the distance data.

Figure 5:
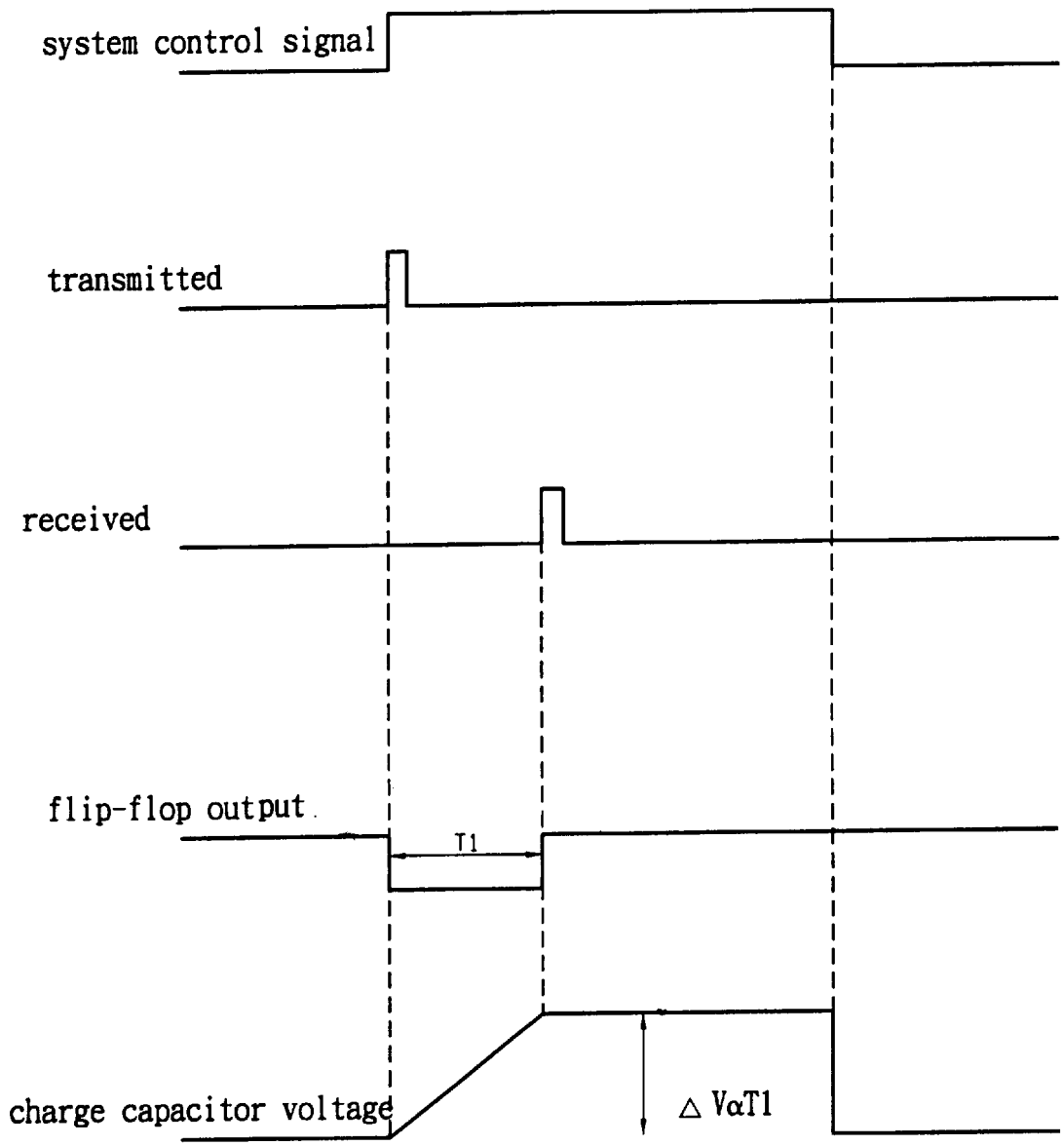
FIG. 5 shows a timing diagram of the precision charge section.

As shown in FIG. 4, a set-reset flip-flop 41 used in this invention will transform a start pulse and a stop signal into an effective negative pulse width (output from Q) by which a high switch speed transistor Q8 is shut off such that a capacitor C11 is linearly charged during the period of the negative pulse width by a constant current source consisting of transistors R25, R26, R27, and R28, an operational amplifier (OP), and the transistor Q8. The voltage after the charge process is held by a zener diode (ZD) and a capacitor C12 and converted by the A/D convertor 70 into the digital signal which is then transferred to the CPU 60. Finally, a high level is sent to resistors R29 and R30 and a transistor Q9 so as to ground the resistors Q9 and liminate the voltage drop stored in the capacitor C12 for the next charge process. The detailed timing diagram associated is shown in FIG. 5.

The accuracy of the precision charge section 40 will be seriously degraded by the thermal effect. The present invention corrects the degraded accuracy by the self-calibration circuit with a calibration method which uses two point correction method. Based on the principle that two points form a line, the method uses the two point calibration charge line to correct and compensate for the variations of the current source and the capacitance values due to the thermal effect. The two electrical data are used by appropriate equations to evaluate a correction gain (Cal) as shown in formula I, and a correction level (Off) as shown in formula II, and a correct value (dcorr) after correction for an instant sample value(dm) can be obtained from formula III.

| formula I | Cal = (d1–d2)/(d1'–d2') |
|---|---|
| formula II | Off = (d2d1'–d1d2')/(d2–d1) |
| formula III | dcorr = Cal* (dm-Off) |

Figures 6A, 6B:
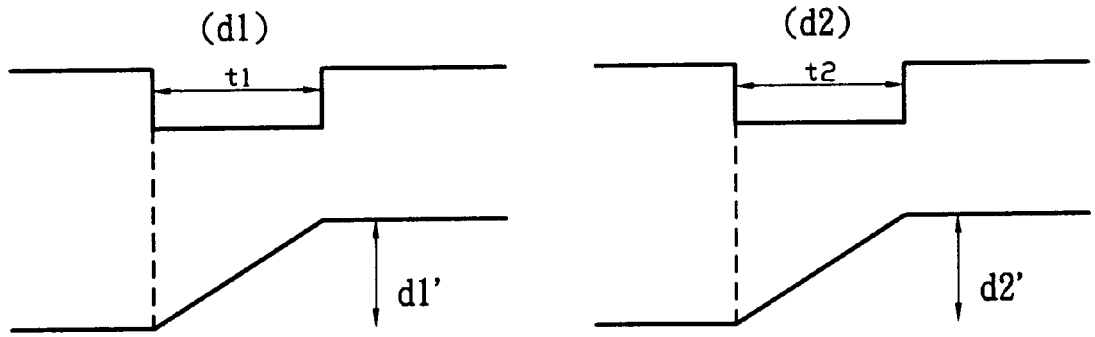
FIGS. 6 A, B, and C illustrate timing diagrams of the self-calibration section.
Figure 6C:
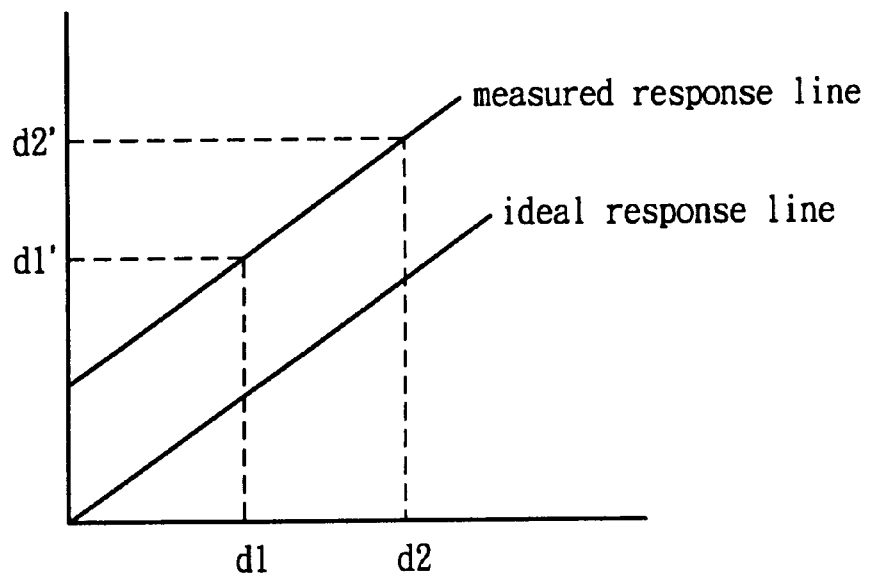

In the above formulas, d1 and d2 are standard voltage values corresponding to ideal response obtained from two correction pulses with width t1 and t2 in a normal environment. The voltage values d1' and d2' correspond to the measured response by the correction pulses of the same width t1 and t2 in the user's environment. As for the correction circuit as shown in FIG. 4, after the system is initiated, the CPU 60 sends two correction pulses with known width to acquire measured data d1' and d2'. The t1 section in FIG. 6A charges the charge circuit with constant current in the precision charge section 40 through a transistor Q10. The constant current is provided by the constant current source which consists of the resistors R25, R26, R27, R28, R31, and R32, the OP, and the transistors Q7 and Q8 to obtain an integration voltage value d1. Similarly, the t2 section in FIG. 6B will obtain an integration voltage value d2 for the correction pulse with defined width. With reference to FIG. 6C, the standard values d1 and d2' which have been obtained in the same manner in a normal environment are used to correct the measured response from d1' and d2' to the ideal response d1 and d2 by the above formula. After the CPU 60 calculates the correction gain (Cal) and the correction level (Off), a normal working process is performed to control the power supply, transmitting, sampling, and the effective average such that the instant sample value (dm) is acquired and finally, the value with the same accuracy is also obtained by the above formula. Therefore, the accuracy smaller than 1 m can be achieved by the self-calibration and thermal compensation circuits.

As the above-mentioned, the present invention provides a solution to increase the ability of laser range finding, which may successfully improve the accuracy of the laser range finder and overcome the drawbacks in the prior arts.

Although only the preferred embodiments of this invention were shown and described in the above description, it is requested that any modification or combination that comes within the spirit of this invention be protected.

What is claimed is:

1. A method for improving the accuracy of range finding for a laser range finder, comprising the steps of:

A. transmitting a laser light towards a desired target;

B. receiving a returned laser light reflected from said desired target;

C. transforming a distance signal to a voltage value, said distance signal corresponding to the time difference between the time instant of transmitting said laser light and the time instant of receiving said returned laser light;

D. converting said voltage value to a digital value;

E. correcting said digital value by calculating the difference between said digital value and a correction level and then multiplying the difference with a correction gain; and F. determining the distance of said desired target from said corrected digital value;

wherein said correction gain and correction level are determined by using a self calibration method comprising the steps of:

a. preparing a first correction pulse;

b. transforming said first correction pulse to a first reference voltage value and converting said first reference voltage value to a first reference digital value d1 in a normal condition;

c. preparing a second correction pulse;

d. transforming said second correction pulse to a second reference voltage value and converting said second reference voltage value to a second reference digital value d2 in a normal condition;

e. generating said first correction pulse after said laser range finder is initialized;

f. transforming said first correction pulse to a first measured voltage value and converting said first measured voltage value to a first measured digital value d1' in a user's condition;

g. generating said second correction pulse;

h. transforming said second correction pulse to a second measured voltage value and converting said second measured voltage value to a second measured digital value d2' in said user's condition; and i. computing said correction gain and said correction level from said first and second reference digital values, and said first and second measured digital values.

2. The method according to claim 1, wherein said step i in said self calibration method is a two point correction method, and said correction gain is computed by (d1−d2)/(d1'−d2') and said correction level is computed by (d2d1'−d1d2')/(d2−d1) respectively.

3. The method according to claim 1, wherein transforming a distance signal to a voltage value in step C is accomplished by using a pulse transforming device to transform a start pulse and a stop signal into a negative pulse width during which a capacitor is linearly charged to said voltage value, said start pulse corresponding to the time instant of transmitting said laser light and said stop signal corresponding to the time instant of receiving said returned laser light.

4. The method according to claim 3, wherein said pulse transforming device is a set-reset flip-flop.

5. An apparatus for improving the accuracy of laser range finding, comprising:

a laser transmitting section for transmitting a laser light towards a desired target;

a laser receiving section for receiving a returned laser light reflected from said desired target;

a high voltage power supply for providing a high voltage to said laser transmitting section and a bias voltage to said laser receiving section;

a precision charge section for converting a distance signal corresponding to a time difference between transmitting said laser light and receiving said returned laser light into a voltage value;

an analog to digital converter for converting said voltage value into a digital value;

a self calibration section for providing a correction pulse to said precision charge section; and a central processing unit for sending control signals to said high voltage power supply and said precision charge section, and sending correction pulses to said self calibration section, said central processing unit receiving said digital value and calculating the distance of said desired target based on a correction gain, a correction level and said digital value;

wherein said correction gain and said correction level are determined by sending two correction pulses to said self calibration section after said apparatus is initialized.

6. The apparatus according to claim 5, said precision charge section comprising a charge capacitor, and a pulse transforming device for transforming a start pulse and a stop signal into a negative pulse width during which said charge capacitor is charged to said voltage value, said start pulse corresponding to the time instant of transmitting said laser light and said stop signal corresponding to the time instant of receiving said returned laser light.

7. The apparatus according to claim 5, said pulse transforming device is a set-reset flip-flop.

* * * * *